(12) United States Patent
Sridharan et al.

(10) Patent No.: US 9,491,055 B1
(45) Date of Patent: Nov. 8, 2016

(54) DETERMINING USER COMMUNITIES IN COMMUNICATION NETWORKS

(75) Inventors: Ashwin Sridharan, Sunnyvale, CA (US); Mukund Seshadri, Oakland, CA (US); James Christopher Schneider, Castro Valley, CA (US); Bodicherla Aditya Prakash, Pittsburgh, PA (US); Christos Faloutsos, Pittsburgh, PA (US); Sridhar Machiraju, Burlingame, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 1188 days.

(21) Appl. No.: 12/764,730

(22) Filed: Apr. 21, 2010

(51) Int. Cl.
*H04L 12/24* (2006.01)
*G06K 9/62* (2006.01)

(52) U.S. Cl.
CPC ............. *H04L 41/12* (2013.01); *G06K 9/6224* (2013.01)

(58) Field of Classification Search
USPC .................................. 709/224–226; 705/319
See application file for complete search history.

(56) References Cited

U.S. PATENT DOCUMENTS

| | | | | |
|---|---|---|---|---|
| 6,871,202 B2* | 3/2005 | Broder | | |
| 7,184,530 B2* | 2/2007 | Warrier | ................... | G06Q 20/28 379/114.15 |
| 7,280,816 B2* | 10/2007 | Fratti | ................... | H04M 3/2218 370/328 |
| 7,321,656 B2* | 1/2008 | Bevente | ................ | H04M 15/00 379/115.01 |
| 7,657,907 B2* | 2/2010 | Fennan | ................... | H04H 60/46 725/14 |
| 7,817,983 B2* | 10/2010 | Cassett et al. | ................ | 455/405 |
| 7,873,074 B1* | 1/2011 | Boland | ................... | H04L 12/14 370/468 |
| 7,889,679 B2* | 2/2011 | Canright | ................. | H04L 41/12 370/252 |
| 8,713,151 B2* | 4/2014 | Gao | ...................... | G06F 9/5072 709/223 |
| 2004/0085908 A1* | 5/2004 | Balasubramanian | ... | H04L 45/46 370/252 |
| 2004/0088396 A1* | 5/2004 | Hammons | ........... | H04L 67/1097 709/223 |
| 2004/0260630 A1* | 12/2004 | Benco | .................... | G06Q 30/02 705/30 |
| 2005/0226153 A1* | 10/2005 | Scifres | .................... | H04L 47/10 370/232 |
| 2006/0074940 A1* | 4/2006 | Craft | ................. | G06F 17/30194 |
| 2007/0168157 A1* | 7/2007 | Khibnik | ................. | G05B 13/04 702/182 |
| 2008/0187178 A1* | 8/2008 | Shamaie | ............ | G06K 9/00355 382/103 |
| 2009/0042537 A1* | 2/2009 | Gelbman | ................ | H04L 12/14 455/406 |

(Continued)

OTHER PUBLICATIONS

Wikipedia, Matrix(mathematics), Jan. 22, 2013 pp. 1-28.*

(Continued)

*Primary Examiner* — Backhean Tiv

(57) ABSTRACT

What is disclosed is a method of operating a communication network, where the communication network comprises a set of users. The method includes obtaining usage activity for each of the users of the set and processing the usage activity to determine connectivity information between individual ones of the users of the set. The method also includes processing the connectivity information to determine users of the set with similar connectivity, and processing the users of the set with similar connectivity to identify a community of users within the users of the set with similar connectivity. The method also includes monitoring at least one of the users in the community to determine if action is needed for at least another one of the users in the community.

10 Claims, 6 Drawing Sheets

(56) References Cited

U.S. PATENT DOCUMENTS

| | | | | |
|---|---|---|---|---|
| 2009/0158309 | A1* | 6/2009 | Moon | G06K 9/00778 725/12 |
| 2010/0031157 | A1* | 2/2010 | Neer | G06Q 10/06 715/738 |
| 2010/0058446 | A1* | 3/2010 | Thwaites | G06F 21/604 726/4 |
| 2010/0144310 | A1* | 6/2010 | Bedingfield, Sr. | H04L 12/1417 455/405 |
| 2010/0169234 | A1* | 7/2010 | Metzger | G06Q 10/067 705/348 |
| 2010/0330954 | A1* | 12/2010 | Manning Cassett | H04L 43/026 455/405 |
| 2011/0010342 | A1* | 1/2011 | Chen | G06F 17/30174 707/637 |
| 2011/0055379 | A1* | 3/2011 | Lin | G06K 9/00677 709/224 |
| 2011/0145926 | A1* | 6/2011 | Dalcher | G06F 11/3466 726/26 |
| 2011/0179164 | A1* | 7/2011 | Memon | H04L 63/1441 709/224 |
| 2012/0084358 | A1* | 4/2012 | Muntz | G06Q 10/00 709/204 |

OTHER PUBLICATIONS

Wikipedia, Eigenvalues and eigenvectors Jan. 22, 2013, p. 1.*

M.E.J.Newman, Finding community structure in networks using the eigenvectors of matrices, Jul. 23, 2006, Department of Physics and Center for the study of Complex System, University of Michigan, Ann Arbor, pp. 1-22.*

Parasuram, Handout M.3-Eigen Values and Eigen Vectors, Jun. 26, 2001, pp. 1-11.*

B. Aditya Prakash, et al., "EigenSpokes: Surprising Patterns and Scalable Community Chipping in Large Graphs," pp. 2-12, Computer Science Department, Carnegie Mellon Univerisy, Sprint Nextel, U.S.A.

* cited by examiner

DETERMINING USER COMMUNITIES IN COMMUNICATION NETWORKS

TECHNICAL FIELD

Aspects of the disclosure are related to the field of communications, and in particular, determining user communities in communication networks.

TECHNICAL BACKGROUND

Communication networks typically include many users or user nodes which communicate with each other. The communication network may allow the many users to exchange a variety of different communication types, such as voice calls, text messages, data exchange, instant messages, or other communications. Although the many users of the communication network may communicate with other users of the communication network, it can be difficult to identify small communities of users within the large number of users of the communication network. Some methods to identify communities of users have been attempted, but these methods typically depend upon prior knowledge or information about the entire communication network, such as a total number communities or a typical size of communities, which can lead to long processing times and cumbersome datasets.

OVERVIEW

What is disclosed is a method of operating a communication network, where the communication network comprises a set of users. The method includes obtaining usage activity for each of the users of the set and processing the usage activity to determine connectivity information between individual ones of the users of the set. The method also includes processing the connectivity information to determine users of the set with similar connectivity, and processing the users of the set with similar connectivity to identify a community of users within the users of the set with similar connectivity. The method also includes monitoring at least one of the users in the community to determine if action is needed for at least another one of the users in the community.

What is also disclosed is a method of operating a communication network, where the communication network comprises a set of users. The method includes monitoring usage activity for each of the users of the set, and processing the usage activity to generate an adjacency matrix comprising connectivity information between individual ones of the users of the set. The method also includes processing the adjacency matrix to determine eigenvectors of the adjacency matrix, processing the eigenvectors to determine if at least two of the eigenvectors are perpendicular. If at least two of the eigenvectors are perpendicular, then the method includes processing the eigenvectors to determine a first user having a highest magnitude in at least a first one of the eigenvectors, and including the first user in a provisional community of users. The method includes identifying additional users having connectivity with at least one user of the provisional community and having high magnitudes in the corresponding eigenvector, and including the additional users in the provisional community until modularity of the provisional community of users decreases. The method also includes processing the provisional community to exclude incorrectly identified users of the provisional community to determine a final community, and transferring network information to the users of the final community.

What is also disclosed is a computer-readable medium, where encoded thereon are instructions executable on a processor for performing a method of operating a communication network, and where the communication network comprises a set of users. The method includes monitoring usage activity for each of the users of the set, and processing the usage activity to generate an adjacency matrix comprising connectivity information between individual ones of the users of the set. The method includes processing the adjacency matrix to determine eigenvectors of the adjacency matrix, and processing the eigenvectors to determine if at least two of the eigenvectors are perpendicular. If at least two of the eigenvectors are perpendicular, then the method includes processing the eigenvectors to determine a first user having a highest magnitude in at least a first one of the eigenvectors, and including the first user in a provisional community of users. The method includes identifying additional users having connectivity with at least one user of the provisional community and having high magnitudes in the corresponding eigenvector, and including the additional users in the provisional community until modularity of the provisional community of users decreases. The method also includes processing the provisional community to exclude incorrectly identified users of the provisional community to determine a final community, and transferring network information to the users of the final community.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
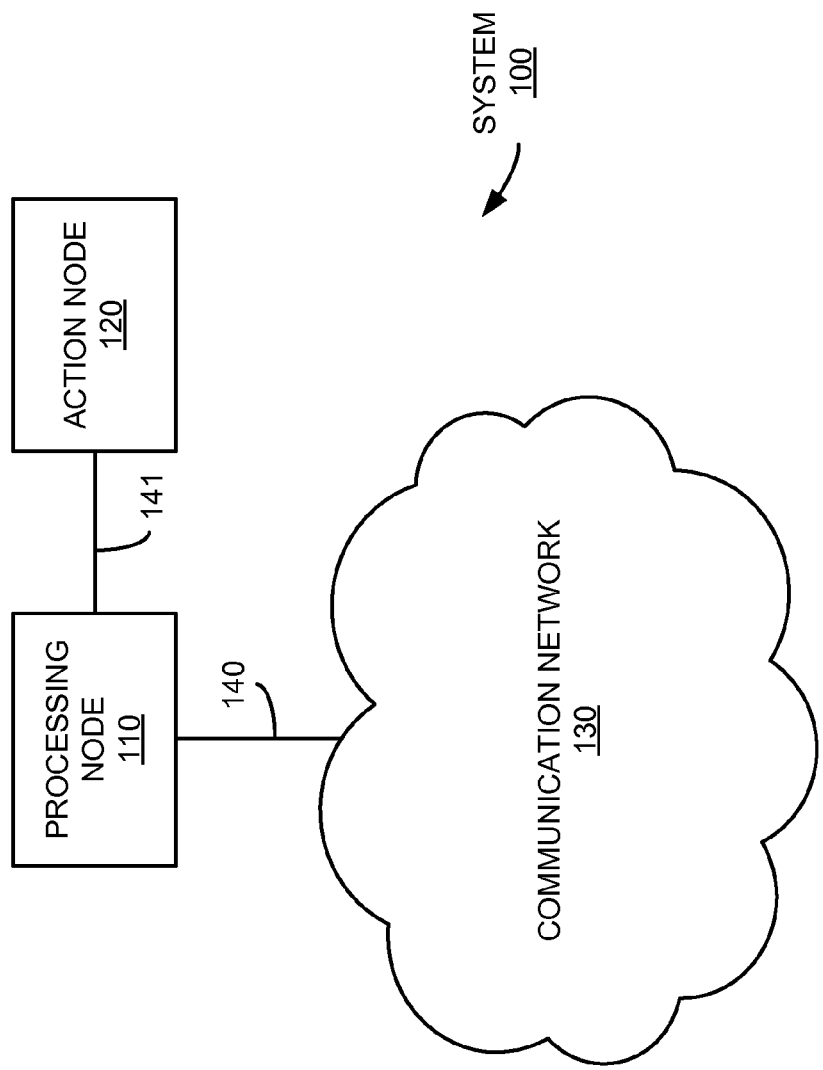
FIG. 1 is a system diagram illustrating a network system.

FIG. 1 is a system diagram illustrating network system 100. System 100 includes processing node 110, action node 120, and communication network 130. Processing node 110 and communication network 130 communicate over link 140. Processing node 110 and action node 120 communicate over link 141. In the example shown in FIG. 1, communication network 130 includes a set of users. The set of users could include all of the users of communication network 130, or a portion thereof. In some examples, the set of users includes all user devices of a communication service provider in a geographic region. The users could include user nodes, user devices, mobile phones, computer nodes, user accounts, communication equipment nodes, or other network communication users or network communication equipment.

Figure 2:
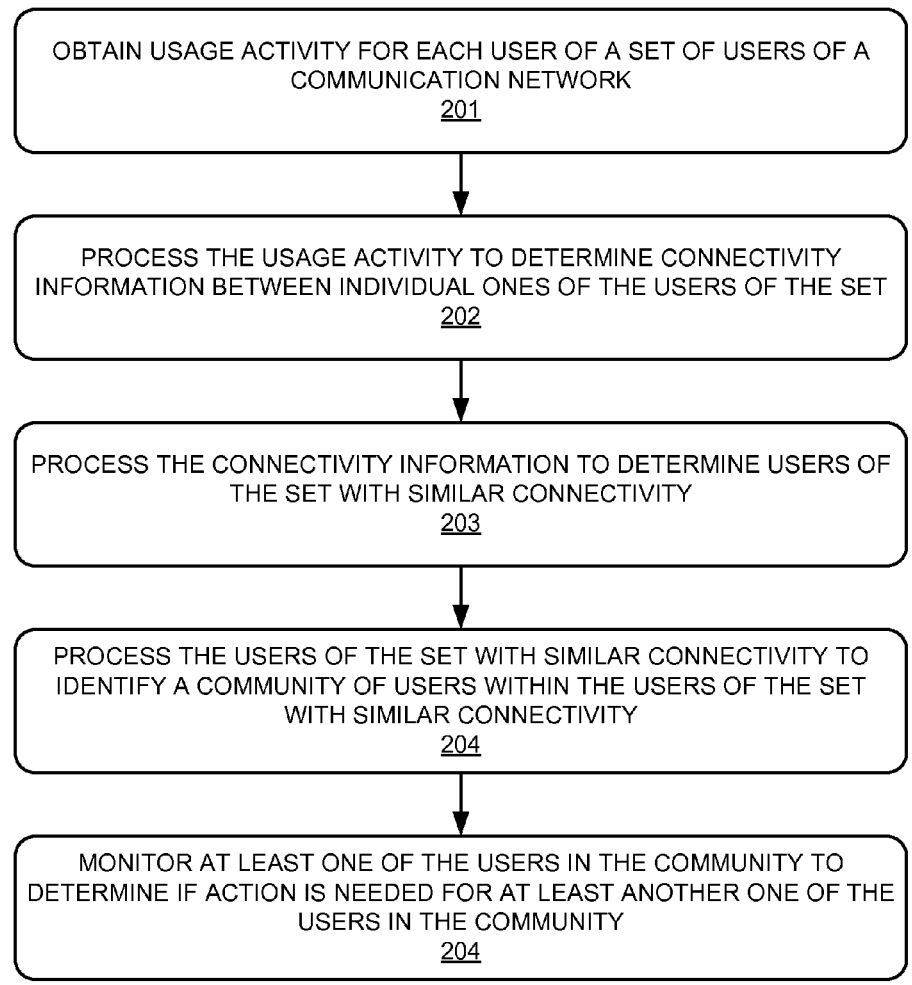
FIG. 2 is a flow diagram illustrating a method of operation of a network system.

FIG. 2 is a flow diagram illustrating a method of operation of network system 100. The operations of FIG. 2 are referenced herein parenthetically. In FIG. 2, processing node 110 obtains (201) usage activity for each user of a set of users of communication network 130. In some examples, processing node 110 obtains the usage activity from a service provider of communication network 130. In other examples, processing node 110 monitors the users of communication network 130 to obtain the usage activity. The usage activity could include communication usage activity of a communication service by users of communication network 130, such as voice calls, text messages, data exchange, data transfer, instant messages, emails, tweets, or other usage activity. Processing node 110 processes (202) the usage activity to determine connectivity information between individual ones of the users of the set. Connectivity information could include which users of the set have communicated with other users of the set. In some examples, indicators are used to represent the connectivity information between individual ones of the users of the set, such as by employing an adjacency matrix or population matrix. Other representations of usage activity could be employed to indicate connectivity information between individual ones of the users of the set, such as spreadsheets, logs, databases, vectors, graphs, charts, or other representations.

Processing node 110 processes (203) the connectivity information to determine users of the set with similar connectivity. Similar connectivity could indicate users which share connectivity information with at least one other user of the set, such as users which placed a voice call to another user. Processing node 110 processes (204) the users of the set with similar connectivity to identify a community of users within the users of the set with similar connectivity. Users of the set with similar connectivity can form communities. A community could include, for example, a portion of users of the set which have common usage activity with each other. In many examples, all users of the set with similar connectivity do not necessarily define a community, and thus a community is identified among the users of the set with similar connectivity.

Action node 120 then monitors (205) at least one of the users in the community to determine if action is needed for at least another one of the users in the community. In some examples, in response to a change in membership of the community, action node 120 could transfer communications to other members of the community. The communications could include a voice call, text message, email, or other communications, including combinations thereof. In other examples, if the change in membership indicates a decline in the community, action node 120 could transfer information to other users of the community. In further examples, the members or users identified as a community could be processed to determine false or incorrectly identified members of the community, such as where a user should not have been identified as a member of the community.

Figure 3:
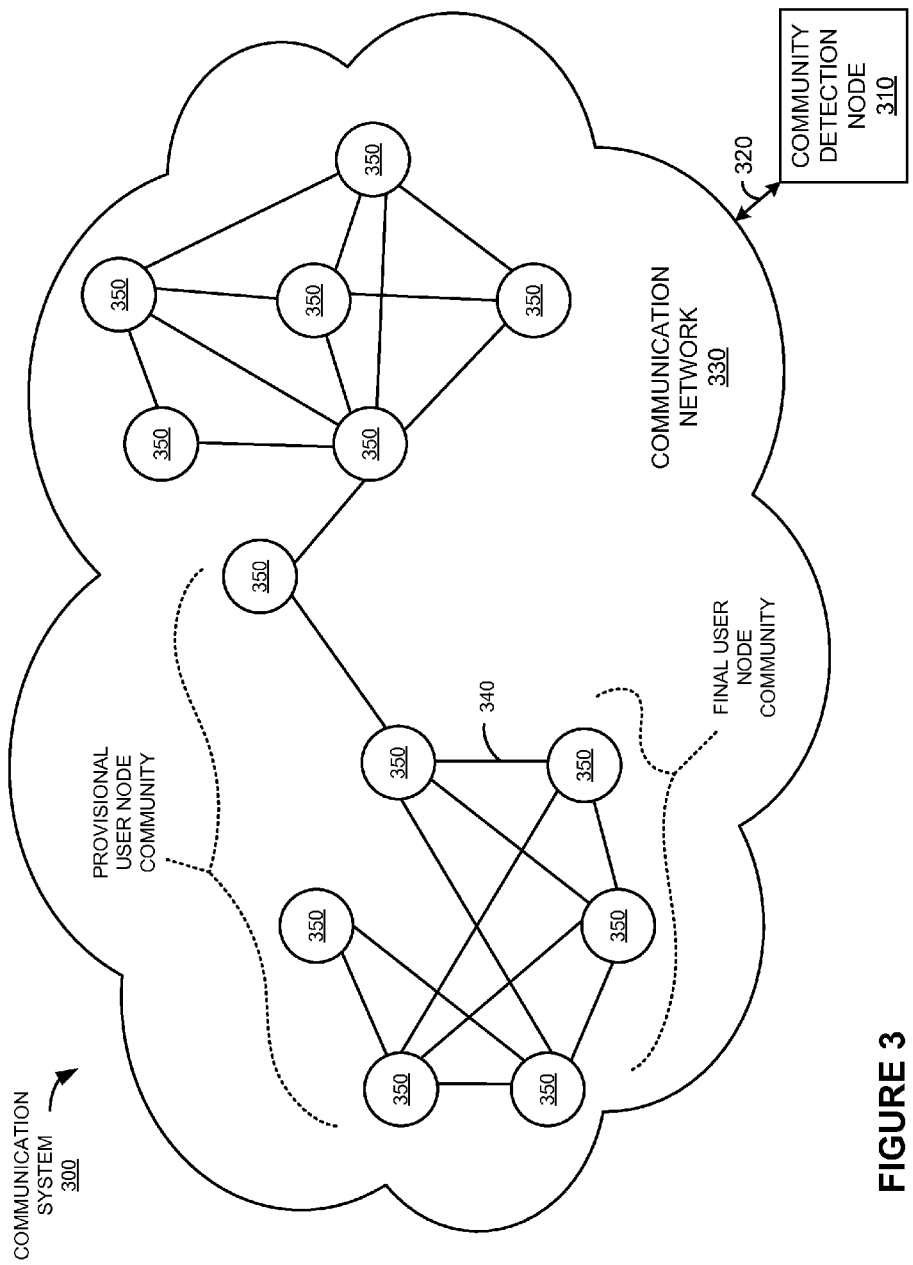
FIG. 3 is a system diagram illustrating a communication system.

FIG. 3 is a system diagram illustrating communication system 300. Communication system 300 includes community detection node 310 and communication network 330. Community detection node 310 and communication network 330 communicate over link 320. In this example, link 320 is a network link carrying Internet protocol (IP) packets. Community detection node 310 comprises a data processing system in this example, such as a microprocessor, computer, server, application server, database system, or other processing system, including combinations thereof. Communication network 330 includes a plurality of user nodes 350, with various activity links 340 indicated by the connecting lines in FIG. 3. In this example, communication network 330 includes user nodes 350 of a wireless service provider over a geographic region. It should be understood that although only one activity link is labeled as 340 in FIG. 3 for clarity, all activity links in FIG. 3 are referenced with label 340, as with user nodes 350. The activity links 340 between user nodes represent usage activity between the associated user nodes, such as voice calls, text messages, data exchange, data transfer, instant messages, emails, tweets, or other usage activity. Although the usage activity occurs over various physical communication media, such as wireless links or IP links, the actual physical communication media are not represented by activity links 340, instead merely the usage activity over any physical link employed. The physical layout and activity links shown in FIG. 3 are merely for visualization purposes, and the user nodes and activity links could have other configurations or arrangements. The user nodes 350 could include user devices, mobile phones, computer nodes, user accounts, communication equipment nodes, or other network communication users or network communication equipment.

Figure 4:
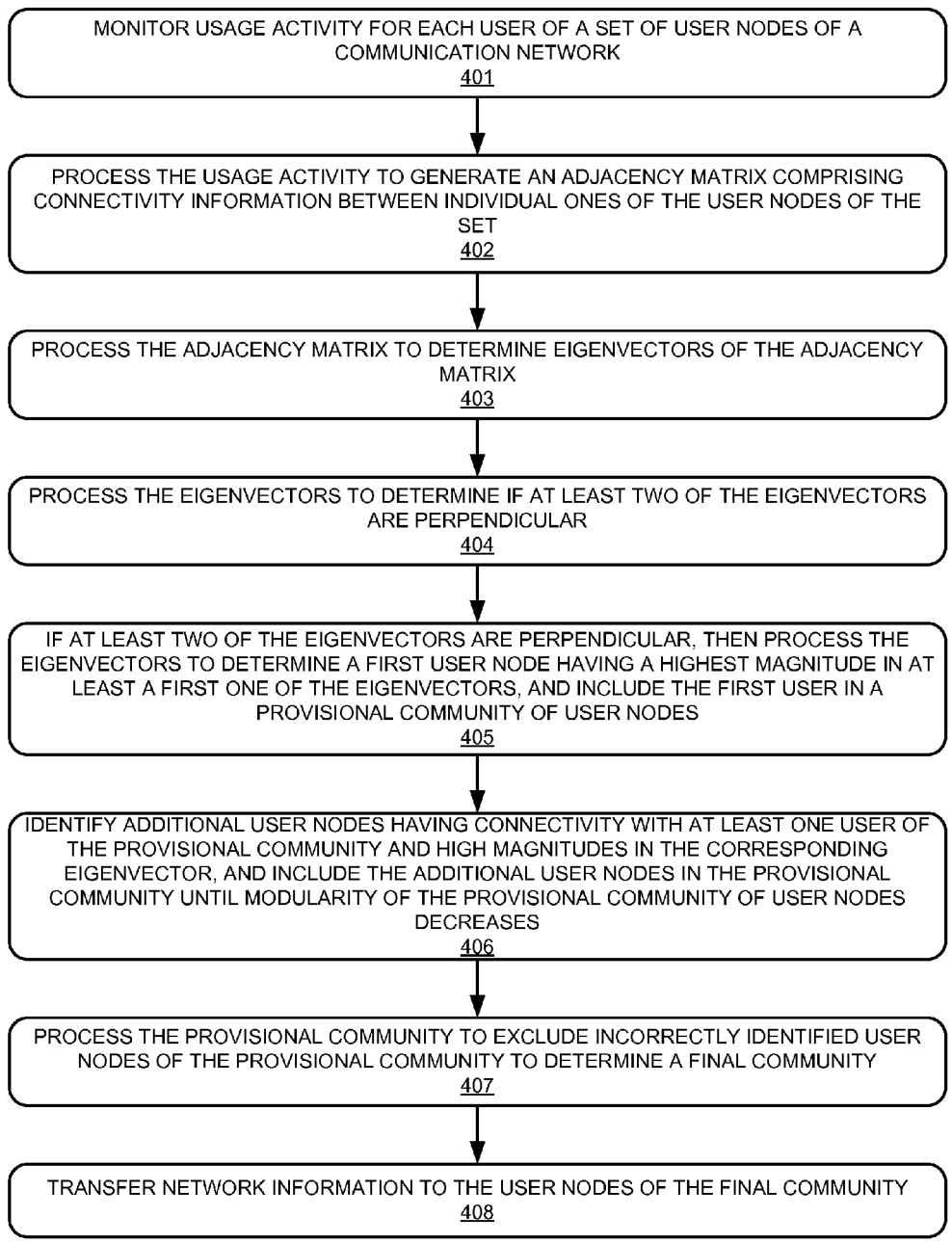
FIG. 4 is a flow diagram illustrating a method of operation of a communication system.

FIG. 4 is a flow diagram illustrating a method of operation of network system 300. The operations of FIG. 4 are referenced herein parenthetically. In FIG. 4, community detection node 310 monitors (401) usage activity for each user of a set of users of communication network 330. In this example, user nodes 350 are included in communication network 330, and community detection node 310 monitors usage activity between each of user nodes 350. Also in this example, the usage activity is represented by activity links 340 between various user nodes in communication network 330. The usage activity monitored by community detection node 310 could be included in a log, database, spreadsheet, graphs, charts, or other data collection dataset stored on a computer-readable medium.

Community detection node 310 processes (402) the usage activity to generate an adjacency matrix comprising connectivity information between individual ones of the users of the set. The adjacency matrix includes an indication, in matrix form, of connectivity information based upon the usage activity between each user node. The connectivity information based upon the usage activity indicates which user nodes are 'adjacent' to one another, such as when two user nodes have an associated activity link. In some examples, a symmetric binary adjacency matrix is employed, where all user nodes are included in both a column and a row of the adjacency matrix, with connectivity information represented by a '1' or '0' within the matrix as determined by the usage activity. For example, if the usage activity represented voice call usage activity between user nodes, and a voice call was completed between a first user node and a second user node, then the symmetric binary adjacency matrix would include a '1' in the intersecting row-column position of the matrix of the first user node and second user node. Other adjacency matrix representations could be employed, such as a unidirectional matrix, a diagonal matrix, a non-symmetric matrix, a non-binary matrix, a matrix where the quantity of usage activity instances could be included in the matrix, a matrix that contains information regarding several usage activity types, among other matrices, including combinations thereof.

Community detection node 310 processes (403) the adjacency matrix to determine eigenvectors of the adjacency matrix. Eigenvectors typically represent linear transformations to a vector or matrix which may change a scalar magnitude but not a direction of the vector or matrix. A representation of the scalar magnitude change is often referred to as an eigenvalue. The number of eigenvectors determined may vary. In some examples, all user nodes of a communication network are represented in an adjacency matrix, and the entire adjacency matrix is processed to determine the eigenvalues. For example, an adjacency matrix representing connectivity between 100 nodes may have 100 eigenvectors. In other examples, a smaller number of user nodes could be included in the adjacency matrix, or a smaller number of eigenvalues could be determined from a larger adjacency matrix. In further examples, decomposition, such as singular value decomposition (SVD) is performed on an adjacency matrix to determine eigenvectors of the adjacency matrix. The singular value decomposition could be used in factorization of the adjacency matrix or to find an approximation of a large matrix.

Community detection node 310 processes (404) the eigenvectors of the adjacency matrix to determine if at least two of the eigenvectors are perpendicular. In this example, two or more eigenvectors are compared to check for any correlation. For example, the eigenvectors could be perpendicular, orthogonal, or otherwise not linearly correlated in other ways. Also in this example, if at least two of the eigenvectors are perpendicular, then a community within the set of user nodes can be determined or extracted. In some examples, a graph or plot of two or more eigenvectors against each other can reveal correlation or non-correlation properties, such as when the plotted values align with an axis or axes, or when the plotted values form 'spokes' which are generally perpendicular to each other. In further examples, a slope and intercept or magnitude and direction are determined for eigenvectors to determine correlation or non-correlation properties. It should be noted that although these eigenvector plots can be determined, the plots are not required to establish correlation or non-correlation properties or to identify communities of user nodes.

If at least two of the eigenvectors of the adjacency matrix are perpendicular, then community detection node 310 processes (405) the eigenvectors to determine a first user node having a highest magnitude along at least a first one of the eigenvectors, and includes the first user node in a provisional community of users. In this example, the first user node acts as a seed for discovering other members of the provisional community. In examples where the eigenvectors are plotted, a highest magnitude or outermost value along a plotted eigenvector could be used to select the first user node. In some examples, each of the user nodes referenced by an eigenvector can correspond to individual magnitudes along the eigenvector, and referred to as a score. The highest scoring user node could then be selected as the first user node. It should be understood that the absolute value of the magnitude could be used in determining the first node, where negative or positive magnitudes are considered without regard to the sign of the magnitude. Other examples may start with other user nodes instead of the user node corresponding to the highest magnitude value, such as the second-highest magnitude, or highest magnitude of a group of nodes selected along the eigenvector, among other user nodes.

Community detection node 310 identifies (406) additional user nodes having connectivity with at least one user node of the provisional community and high magnitudes in the corresponding eigenvector, and includes the additional user nodes in the provisional community until modularity of the provisional community decreases. As shown in FIG. 3, a provisional community of user nodes is labeled as including seven user nodes. In some examples, the additional user nodes are identified as having high magnitudes or values in or along a single eigenvector, where the first user node was selected as corresponding to a highest magnitude value along the eigenvector. A high magnitude could refer to a user node corresponding to a next lower magnitude along the eigenvector compared to the magnitude corresponding to the first user node, a next lower magnitude in a sequence of magnitudes along the eigenvector, magnitudes within a selected top range, group, or portion of corresponding user nodes, among other magnitudes. Additional user nodes that share connectivity with at least one other node already identified as being within the provisional community and having high magnitudes in the corresponding eigenvector are added to the provisional community.

Modularity is one possible measure of how well connected a community is, and can be determined by comparing the connectivity or interconnectedness between user nodes identified in the provisional community against a random model of expected connectivity. In this example the inclusion or identification of additional user nodes terminates when the modularity of the provisional community decreases, or alternately, the identification continues as long as the modularity of the provisional community increases or does not decrease. In further examples, the conductance of the provisional community is determined and monitored as additional nodes are identified, and the inclusion or identification process terminates when the conductance of the provisional community increases, or alternately, the identification continues as long as the conductance of the provisional community decreases or does not increase. Conductance is another possible measure of how well connected a community is, based upon a speed of convergence of a random walk among the user nodes comprising the community. In some examples, both modularity and conductance are monitored as additional user nodes are identified for the provisional community. Other metrics of the connectedness of the provisional community could be employed.

Community detection node 310 processes (407) the provisional community to exclude incorrectly identified user nodes of the provisional community to determine a final community. Once the process in operation 406 identifies members of the provisional community, incorrectly identified members, such as false members or incorrectly included members, are identified and excluded from the provisional community to form a final community. As shown in FIG. 3, a final community of user nodes is labeled as including six user nodes, excluding one user node from the provisional community. In some examples, although a user node is initially identified as being a part of the provisional community and may be connected with another user node in the provisional community, it may not have enough connectedness or relation to the other user nodes identified in the provisional community to be a true member. For example, in FIG. 3, the excluded user node only has a single activity link to other user nodes of the provisional community, and is excluded from the final community. In some examples, spectral clustering, such as by the use of similarity analysis, of the provisional community is processed to exclude the false user nodes.

Community detection node 310 transfers (408) network information to the user nodes of the final community. Once the final community has been identified, several actions could be taken. Network information could be transferred to the user nodes of the final community, such as network alerts via text messages, emails, voice calls, or via other network applications. The network alerts could be related to the activities of the user nodes of the final community, or could be initiated by the status of communication network 330. In other examples, communication network 330 or community detection node 310 does not wish to include user nodes which are not members of the final community in network communications. This exclusion of non-member user nodes can increase network efficiency by not transferring unneeded network information, and allow the operator of communication network 330 or community detection node 310 to narrowly target information for the user nodes of a community. Additionally, communication network 330 or community detection node 310 could be alerted to a change in the composition or size of the final community. For example, if a member of the community changes service providers, or discontinues service for communication network 330, then communication network 330 or community detection node 310 could transfer network-related information to the remaining members of the community. In some examples, targeted emails or voice calls from customer service personnel or via automated customer service systems could be alerted to a change in membership, and be distributed to the remaining members of the community.

In further examples, multiple types of usage activity could be analyzed and communities extracted based upon the multiple types of usage activity. For example, voice call usage activity and text message activity could be analyzed to determine two communities with similar members. The two communities could be further refined, and false members excluded based upon multiple usage activities. As a further example, different actions could be taken for each community based upon the usage activity type. Text message-based network information could be transferred to user nodes of a community determined from text message usage activity, and voice call-based network information could be transferred to user nodes of a community determined by voice call usage activity, as one example. Additionally, the user nodes of a single or of multiple service providers could be analyzed to determine a shift in communities between service providers, or a shift in usage activity from one communication type to another.

Figure 5:
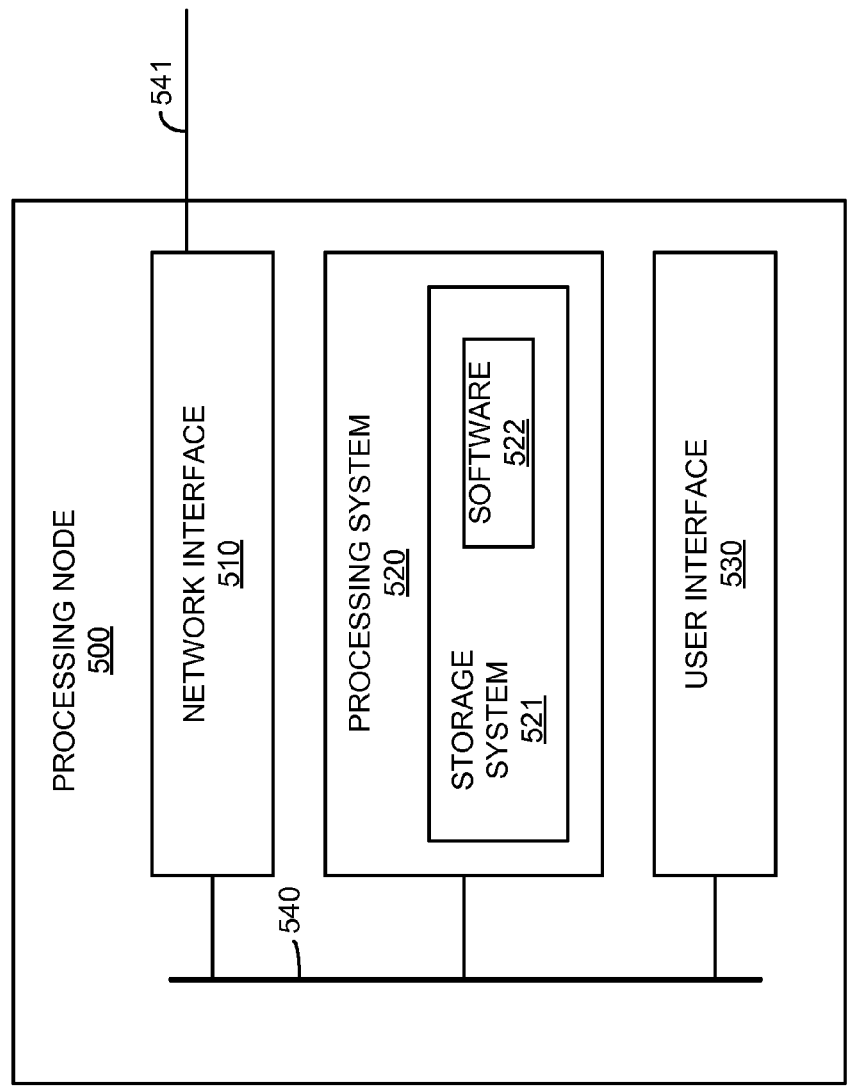
FIG. 5 is a block diagram illustrating a community detection node.

FIG. 5 is a block diagram illustrating processing node 500, as an example of processing node 110 found in FIG. 1 or community detection node 310 in FIG. 3, although processing node 110 or community detection node 310 could use other configurations. Processing node 500 includes network interface 510, processing system 520, and user interface 530. Network interface 510, processing system 520, and user interface 530 communicate over bus 540. Processing node 500 may be distributed among multiple devices that together form elements 510, 520-522, 530, and 540.

Network interface 510 comprises network router and gateway equipment for communicating with a core network of a communication provider, such as with communication networks 130 or 330. Network interface 510 exchanges communications over link 541. Link 541 could use various protocols or communication formats as described herein for links 140-141 or 320, including combinations, variations, or improvements thereof.

Processing system 520 includes storage system 521. Processing system 520 retrieves and executes software 522 from storage system 521. In some examples, processing system 520 is located within the same equipment in which network interface 510 or user interface 530 is located. In further examples, processing system 520 comprises specialized circuitry, and software 522 or storage system 521 could be included in the specialized circuitry to operate processing system 520 as described herein. Storage system 521 could include a computer-readable medium such as a disk, tape, integrated circuit, server, or some other memory device, and also may be distributed among multiple memory devices. Software 522 may include an operating system, logs, databases, utilities, drivers, networking software, and other software typically loaded onto a computer system. Software 522 could contain an application program, firmware, or some other form of computer-readable processing instructions. When executed by processing system 520, software 522 directs processing system 520 to operate as described herein, such as obtain or monitor usage activity of users, process the usage activity to identify a community of users, and determine if action is needed for members of the community.

User interface 530 includes equipment and circuitry for receiving user input and control. Examples of the equipment and circuitry for receiving user input and control include push buttons, touch screens, selection knobs, dials, switches, actuators, keys, keyboards, pointer devices, microphones, transducers, potentiometers, non-contact sensing circuitry, or other human-interface equipment. User interface 530 also includes equipment to communicate information to a user of processing node 500. Examples of the equipment to communicate information to the user could include indicator lights, lamps, light-emitting diodes, displays, haptic feedback devices, audible signal transducers, speakers, buzzers, alarms, vibration devices, or other indicator equipment, including combinations thereof.

Bus 540 comprises a physical, logical, or virtual communication link, capable of communicating data, control signals, and other communications. In some examples, bus 540 is encapsulated within the elements of network interface 510, processing system 520, or user interface 530 and may include a software or logical link. In other examples, bus 540 uses various communication media, such as air, space, metal, optical fiber, or some other signal propagation path, including combinations thereof. Bus 540 could be a direct link or might include various equipment, intermediate components, systems, and networks.

Figure 6:
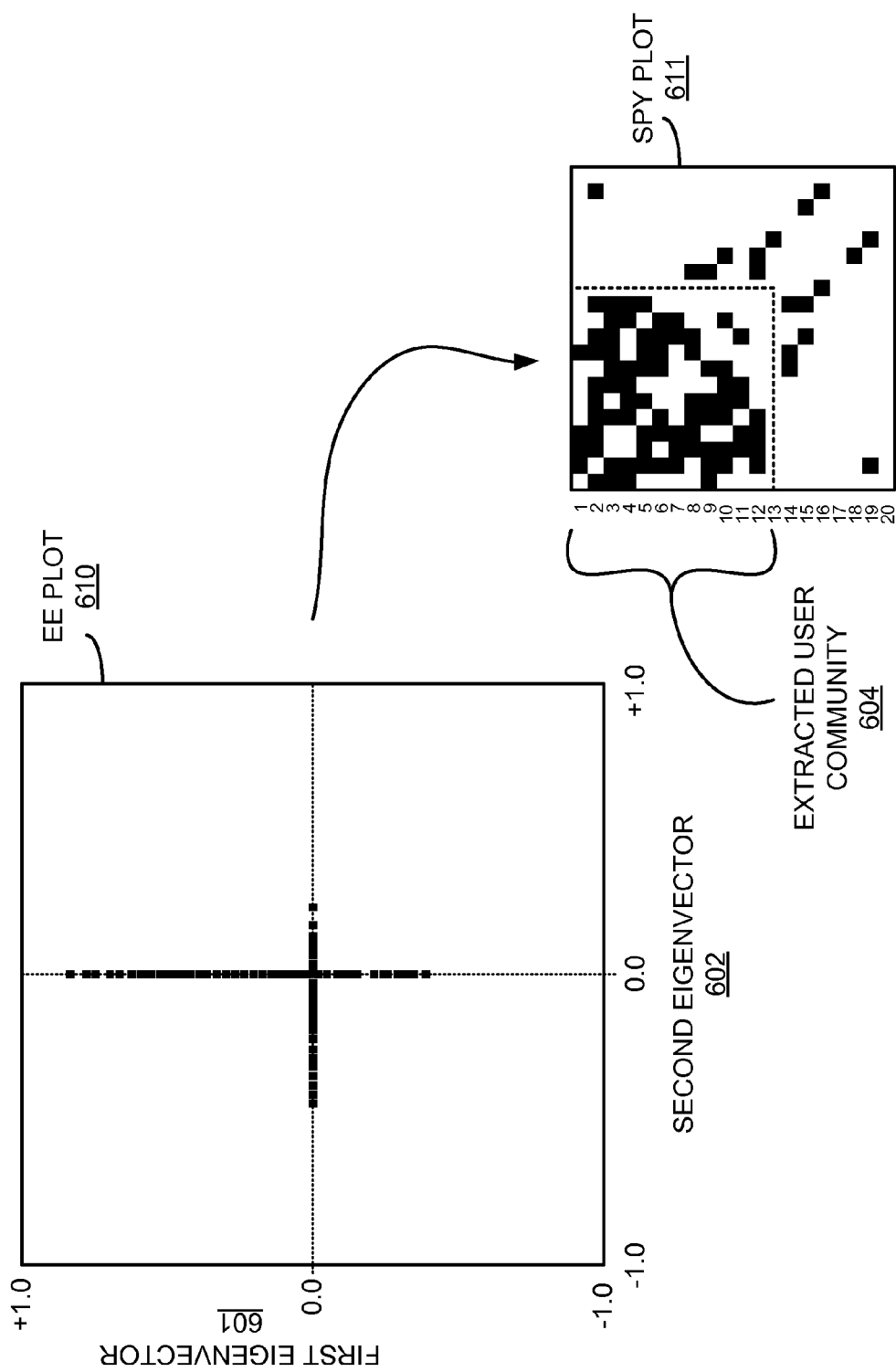
FIG. 6 includes two graphs illustrating a method of community detection.

FIG. 6 includes two graphs illustrating an example method of user community extraction. In FIG. 6, an eigenvector-eigenvector plot (EE Plot) 610 and spy plot 611 are included which illustrate an example graphical method of determining an extracted user community 604, although other methods could be employed, as discussed herein in FIGS. 2 and 4. It should be understood that the points and values plotted in both EE plot 610 and spy plot 611, as well as the numerical axis labels, are merely exemplary.

In the example shown in FIG. 6, a symmetric binary adjacency matrix is first determined representing connectivity information of voice call activity between user devices in a wireless communication network, such as communication network 130 in FIG. 1 or communication network 330 in FIG. 3, although other configurations could be used. The connectivity information is based upon voice calls between user devices in this example, and indicates the user devices, such as mobile phones, that are 'adjacent' to one another, such as when two user devices have shared a voice call. The symmetric binary adjacency matrix, which isn't shown in FIG. 6 for clarity, includes connectivity information represented by a '1' or '0' for each user device, and the connectivity information is redundantly included for each user device that has shared a voice call with another user device. For example, if user device A calls user device B, then the symmetric binary adjacency matrix would include a '1' in the matrix position representing where A is connected, as well as the matrix position representing where B is connected to A. Singular value decomposition (SVD) is performed on the adjacency matrix to determine eigenvectors of the adjacency matrix. Two of the eigenvectors of the adjacency matrix, namely first eigenvector 601 and second eigenvector 602, are plotted against each other in EE plot 610. EE plot 610 includes first eigenvector 601 plotted along the vertical axis (y-axis) and second eigenvector 602 plotted along the horizontal axis (x-axis). As seen in EE plot 610, first eigenvector 601 lies predominantly along the y-axis itself, and second eigenvector 602 lies predominantly along the x-axis itself, forming a spoke pattern, which could be referred to as an 'eigenspoke' in some examples. The eigenspoke pattern illustrates that values along at least two eigenvectors are not linearly correlated. In many examples, the eigenspoke pattern also illustrates that at least two eigenvectors are perpendicular. It should be understood that EE plots of more than two eigenvectors, such as a three-dimensional plot of three eigenvectors, could be employed to determine if an eigenspoke pattern emerges or to extract user connectivity information as discussed below. In example user connectivity sets where an eigenspoke pattern does not emerge, a different community detection method could be employed than that discussed regarding FIG. 6. The presence of eigenspoke pattern in this example implies that corresponding user devices which have plotted values close to each other on EE plot 610 have similar values along at least two eigenvectors, and are connected to each other, but may not necessarily be a part of a user community.

The user devices that correspond to outlying points of the EE plot 610 are then identified and plotted together in spy plot 611. In this example, only the outlying points along one end of a single eigenvector are selected, such as the outlying points along the 'top' or positive portion of first eigenvector 601, although other portions could be selected. As the points plotted in EE plot 610 are values of eigenvectors representing user device connectivity, and not actual user devices, the selected points must be correlated to user devices based upon the eigenvector from which the points of EE plot 610 are derived. In this example, spy plot 611 includes the top 20 user devices corresponding to the outlying points along the positive portion of first eigenvector 601, plotted together. The top 20 user devices are identified by correlating the values in EE plot 610 to user devices, and the associated adjacency information is plotted in spy plot 611. In this example, the associated adjacency information is the original connectivity information of the original adjacency matrix for each of the 20 identified user devices. As seen in spy plot 611, a cluster of high connectivity is shown between user devices 1-12, and a low connectivity is shown between user devices 13-20. A user community can then be identified as corresponding to user devices having the highest density of connectivity, namely user devices 1-12, forming extracted user community 604 enveloped by the dashed line in spy plot 611. It should be noted that since the original adjacency matrix in this example is a symmetric binary adjacency matrix, the connectivity information shown in spy plot 611 will typically be mirrored across a diagonal of the spy plot.

Once members of the user community are extracted and identified, network information could be transferred to the members of the user community. The network information could include network alerts via text messages, emails, voice calls, or via other network applications. The network alerts could also be related to the activities of the user devices of the user community, or could be initiated by a change in membership of the user community, such as a change in the composition or size of the user community. For example, if a member of the community changes service providers, or discontinues service for the wireless communication network, then network-related information could be transferred to the remaining members of the user community. In some examples, targeted emails or voice calls from customer service personnel or via automated customer service systems could be alerted to a change in membership, and be distributed to the remaining members of the community.

The original adjacency matrix discussed in the example of FIG. 6 includes many user devices of the wireless communication network, and could include a very large number of user devices of the wireless communication network depending upon the number selected for inclusion in the original adjacency matrix. The method described for FIG. 6 describes a method to extract a community of user devices included in the original adjacency matrix which have a high connectivity with each other, and thus define identified user community 604 within the original set of user devices. Advantageously, the method described herein extracts user communities of similar connectivity, beyond mere mutual connectivity. In further examples, multiple EE plots and associated spy plots could be determined for multiple eigenvectors as determined for the adjacency matrix of user device connectivity. These multiple plots could be compared to further refine identification and extraction of user communities, to exclude false users of the user community, and extract multiple communities from the original connectivity or adjacency information.

Referring back to FIG. 1, processing node 110 comprises systems and equipment for monitoring or obtaining usage activity information about users in communication network 130, as well as identifying communities among the users of communication network 130. In some examples, the information is received from communication network 130 over link 140, while in other examples, the information is received from a service provider of communication network 130. Processing node 110 also includes communication interfaces, as well as computer systems, microprocessors, circuitry, or some other processing devices or software systems, and may be distributed among multiple processing devices. Examples of processing node 110 may also include software such as an operating system, logs, databases, utilities, drivers, networking software, and other software stored on a computer-readable medium. Processing node 110 could also include application servers, application service provider systems, database systems, web servers, or other systems.

Action node 120 comprises systems and equipment to determine if action is needed for members of a community of communication network 130, and to take action for members of a community of communication network 130, such as transferring network information. In some examples, network information is determined by action node 120 and transferred to communication network 130 through processing node 110. In other examples, action node 120 has a communication link to systems in communication network 110. Action node 120 also includes communication interfaces, as well as computer systems, microprocessors, circuitry, or some other processing devices or software systems, and may be distributed among multiple processing devices. Examples of action node 120 may also include software such as an operating system, logs, databases, utilities, drivers, networking software, and other software stored on a computer-readable medium. Action node 120 could also include application servers, application service provider systems, database systems, web servers, or other systems.

Communication network 130 comprises a network of users. In some examples, communication network 130 includes a wireless communication network, where wireless access to communication services is provided to many wireless communication devices over a geographic area. In other examples, communication network 130 includes users communicating over networks such as an Internet network, local area network (LAN), wide area network (WAN), social network, or other computer-based network. Communication network 130 may also comprise optical networks, asynchronous transfer mode (ATM) networks, packet networks, metropolitan-area networks (MAN), or other network topologies, equipment, or systems, including combinations thereof. The users in communication network 130 could each comprise a user node, user device, user account, web page, hyperlink, wireless communication device, mobile phone, subscriber equipment, customer equipment, access terminal, telephone, mobile wireless telephone, computer, e-book, mobile Internet appliance, wireless network interface card, media player, game console, or some other communication apparatus, communication node, or linked datum, including combinations thereof.

Communication links 140-141 each use metal, glass, optical, air, space, or some other material as the transport media. Communication links 140-141 could each use various communication protocols, such as Time Division Multiplex (TDM), asynchronous transfer mode (ATM), Internet Protocol (IP), Ethernet, synchronous optical networking (SONET), circuit-switched, communication signaling, or some other communication format, including combinations, improvements, or variations thereof. Communication links 140-141 could each be direct links or may include intermediate networks, systems, or devices.

FIGS. 1-6 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a processing node for a communication network having a set of users, the method comprising:
    in the processing node, monitoring usage activity for the set of users of the communication network;
    in the processing node, processing the usage activity for the set of users to generate an adjacency matrix comprising connectivity information between individual ones of the users of the set;
    in the processing node, processing the adjacency matrix to determine eigenvectors;
    in the processing node, if at least two of the eigenvectors are perpendicular, then processing the eigenvectors to determine a first user node of the set of users with a highest magnitude along a first eigenvector of the eigenvectors, and including the first user node in a provisional user community having shared connectivity;
    in the processing node, identifying additional user nodes of the set of users having high magnitudes along the first eigenvector and that share connectivity with at least one other user node already included in the provisional user community, and including the additional user nodes in the provisional user community until modularity of the provisional user community decreases;
    in the processing node, processing the provisional user community to identify and exclude incorrectly identified user nodes of the provisional user community to determine a final user community; and
    in the processing node, processing the final user community to determine when a change in the final user community occurs and then notifying remaining users of the final user community of the change in the final user community.

2. The method of claim 1 wherein processing the adjacency matrix to determine the eigenvectors comprises performing decomposition on the adjacency matrix.

3. The method of claim 1 wherein the adjacency matrix includes quantities of usage activity instances and information associated with a plurality of usage activity types.

4. The method of claim 1, wherein processing the provisional user community to identify and exclude the incorrectly identified user nodes of the provisional user community to determine the final user community comprises processing a spectral clustering of the provisional user community to identify and remove the incorrectly identified user nodes from the provisional user community.

5. The method of claim 1 wherein including the additional user nodes in the provisional user community comprises including the additional user nodes in the provisional user community until conductance of the provisional user community increases.

6. A software apparatus to control a processing node for a communication network having a set of users, the software apparatus comprising:
    software that is configured, when executed by the processing node, to direct the processing node to monitor usage activity for the set of users of the communication network, process the usage activity for the set of users to generate an adjacency matrix comprising connectivity information between individual ones of the users of the set, process the adjacency matrix to determine eigenvectors, and if at least two of the eigenvectors are perpendicular, then process the eigenvectors to determine a first user node of the set of users with a highest magnitude along a first eigenvector of the eigenvectors and include the first user node in a provisional user community having shared connectivity, identify additional user nodes of the set of users having high magnitudes along the first eigenvector and that share connectivity with at least one other user node already included in the provisional user community, and include the additional user nodes in the provisional user community until modularity of the provisional user community decreases, process the provisional user community to identify and exclude incorrectly identified user nodes of the provisional user community to determine a final user community, and process the final user community to determine when a change in the final user community occurs and then notify remaining users of the final user community of the change in the final user community; and
    a storage system storing the software.

7. The software apparatus of claim 6 wherein the software configured to direct the processing node to process the adjacency matrix to determine the eigenvectors comprises the software configured to direct the processing node to perform decomposition on the adjacency matrix.

8. The software apparatus of claim 6 wherein the adjacency matrix includes quantities of usage activity instances and information associated with a plurality of usage activity types.

9. The software apparatus of claim 6 wherein the software configured to direct the processing node to process the provisional user community to identify and exclude the incorrectly identified user nodes of the provisional user community to determine the final user community comprises the software configured to direct the processing node to process a spectral clustering of the provisional user community to identify and remove the incorrectly identified user nodes from the provisional user community.

10. The software apparatus of claim 6 wherein the software configured to direct the processing node to include the additional user nodes in the provisional user community comprises the software configured to direct the processing node to include the additional user nodes in the provisional user community until conductance of the provisional user community increases.

* * * * *